United States Patent Office 3,147,287
Patented Sept. 1, 1964

3,147,287
ANTHRAQUINONE DERIVATIVES CONTAINING BETA - HALOETHYL, GAMMA - HALOPROPYL, GAMMA-HALO-BETA - HYDROXYPROPYL OR GAMMA - HALO - BETA - HALOPROPYL SUBSTITUENTS
Violet Boyd and Frank Lodge, Manchester, England, assignors to Imperial Chemical Industries Limited, London, England, a corporation of Great Britain
No Drawing. Filed Mar. 7, 1962, Ser. No. 177,956
1 Claim. (Cl. 260—373)

This invention relates to new anthraquinone dyestuffs and more particularly it relates to new water-insoluble anthraquinone dyestuffs which are valuable for colouring natural and artificial textile materials.

According to the invention there are provided the new water-soluble anthraquinone dyestuffs of the formula:

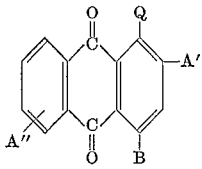

wherein Q represents a member selected from the group consisting of amino, lower alkylamino and cyclohexylamino, one of A' and A" represents the group of the formula: —X—Y—SO$_2$NH—R and the other of A' and A" represents a member selected from the group consisting of hydrogen and a group of the formula:

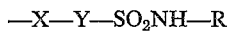

B represents a member selected from the group consisting of hydroxy, amino, lower alkylamino, cyclohexylamino and a —NH—Y—SO$_2$NH—R group, X represents a member selected from the group consisting of —O— and —S—, Y represents a member selected from the group consisting of phenylene and tolylene; R represents a member selected from the group consisting of β-chloroethyl, β-bromoethyl, γ-chloropropyl, γ-bromopropyl, γ-chloro-β-hydroxypropyl, γ-bromo-β-hydroxypropyl, β:γ-dichloropropyl and β:γ-dibromopropyl; and the anthraquinone nucleus can carry additional substituents selected from the group consisting of chlorine and bormine.

As examples of the lower alkylamino groups represented by Q and B there are mentioned lower alkylamino groups wherein the alkyl portion contains from 1 to 6 carbon atoms such as methylamino, ethylamino, n-propylamino, isopropylamino, n-butylamino, n-amylamino and n-hexylamino groups.

The hydrogen atom or the —X—Y—SO$_2$NH—R group, as hereinbefore defined, which is represented by A" is attached to the 5-, 6-, 7- or 8-position of the anthraquinone nucleus. When the anthraquinone nucleus carries as additional substituent a chlorine atom or a bromine atom this can be attached to any carbon atom of the anthraquinone nucleus which is not already carrying a substituent represented by A', A", B and Q.

The new anthraquinone dyestuffs, as hereinbefore defined, can be obtained by reacting together an amine of the formula: R—NH$_2$, wherein R has the meaning stated above, and an anthraquinone compound of the formula:

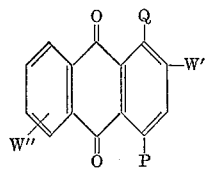

(Formula I)

wherein Q has the meaning stated above, one of W' and W" represents a group of the formula: —X—Y—SO$_2$Cl and the other of W' and W" represents a hydrogen atom or a group of the formula: —X—Y—SO$_2$Cl, P represents a member selected from the group consisting of hydroxy, amino, lower alkylamino, cyclohexylamino and a —NH—Y—SO$_2$Cl group, X and Y have the meanings stated above, and the anthraquinone nucleus can carry a chlorine or a bromine atom as an additional substituent.

This reaction may be conveniently brought about by reacting the amine, the anthraquinone compound and an acid binding agent, for example sodium carbonate or potassium carbonate, together in water or in an organic liquid which is miscible with water, for example acetone or dimethylformamide, or in a mixture of water and a water-miscible organic liquid, preferably at a temperature between 0° and 25° C., adding water and filtering off the dyestuff which is precipitated.

As examples of amines of the formula: R—NH$_2$ which may be used, there may be mentioned β-chloroethylamine, β-bromoethylamino, γ-chloropropylamine, γ-bromopropylamine, β:γ-dichloropropylamine, β:γ-dibromopropylamine, γ-chloro-β-hydroxypropylamine and γ-bromo-β-hydroxypropylamine.

If desired the aimne may be used in the form of a salt, for example the hydrochloride or hydrobromide.

The anthraquinone compounds of Formula I may themselves be obtained by reacting together chlorosulphonic acid and an anthraquinone compound of the formula:

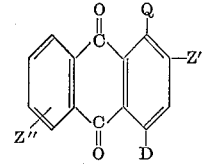

(Formula II)

wherein Q has the meaning stated above, Z' and Z" each represent a hydrogen atom or a group of the formula: —X—YH provided that Z' and Z" are not both hydrogen atoms, D represents a hydroxy, amino, lower alkylamino, cyclohexylamino or —NH—YH group, X and Y have the meanings stated above, and the anthraquinone nucleus may carry a chlorine or a bromine atom as an additional substituent.

As examples of anthraquinone compounds of Formula II there may be mentioned 1:4-diamino-2-phenoxyanthraquinone, 1-amino-4-hydroxy-2-phenoxyanthraquinone, 1-amino-4-anilino-2-phenoxyanthraquinone, 1:4-diamino-3-chloro-2-phenoxyanthraquinone, 1:4-diamino-3-bromo-2-phenoxyanthraquinone, 1:4-diamino-2 - (4' - methylphenoxy)anthraquinone, 5-, 6-, 7- or 8-chloro-1:4-diamino-2-phenoxyanthraquinone, 1 - amino-4-anilino-7-phenylthioanthraquinone, 1:4 - diamino - 2:5 - di(phenoxy)anthraquinone, 1-amino-2-(4'-methylphenoxy)-4-(4"-methylanilino)anthraquinone, 1 - amino - 4-isopropylamino-8-phenoxyanthraquinone, 1:4-di(cyclohexylamino)-5-phenoxyanthraquinone and 1 - amino-4-cyclohexylamino-2-phenoxyanthraquinone.

The new anthraquinone dyestuffs, as hereinbefore defined, where R represents a β:γ-dichloropropyl or β:γ-dibromopropyl group may also be obtained by reacting an anthraquinone compound of Formula I with allylamine and then with chlorine or bromine.

This may be conveniently brought about by reacting the anthraquinone compound and allylamino together in water or in a mixture of water and a water-miscible organic liquid, preferably at a temperature between 0° and 25° C., filtering off the compound which is precipitated, drying it, stirring the dried solid in an organic liquid, for example carbon tetrachlorde, adding the chlorine or bromine, stirring the mixture, preferably at a temperature between 20° and 30° C., and filtering off the precipitated dyestuff. When preparing the dyestuff containing one or more β:γ-dibromopropyl groups it is preferred to subsequently treat the dyestuff with an aqueous solution of a sulphite, for example sodium sulphite or sodium bisulphite, to remove any excess bromine which may be present in the dyestuff.

A preferred class of the new water-insoluble anthraquinone dyestuffs of the invention are those dyestuffs wherein A′ represents a group of the formula:

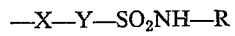

as hereinbefore defined, and A″ represents a hydrogen atom.

As specific examples of dyestuffs of this preferred class there may be mentioned the dyestuffs of the formula:

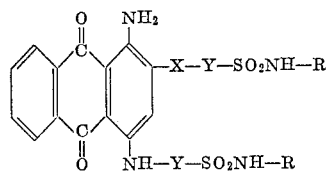

wherein R, X and Y have the meanings stated above, but it is preferred that X represents an oxygen atom.

The new water-insoluble anthraquinone dyestuffs, as hereinbefore defined, are valuable for colouring, either by dyeing or printing methods, textile materials comprising natural and artificial fibres, for example wool, silk, cotton, viscose rayon, cellulose acetate rayon, cellulose triacetate, polyamide, polyacrylonitrile and aromatic polyester fibres. For colouring such textile materials it is preferred to use the new anthraquinone dyestuffs in a finely dispersed form which may be obtained by milling the anthraquinone dyestuffs with water and a dispersing agent. If desired the so-obtained dispersed aqueous paste of the dyestuff may be dried to form a re-dispersible powder which may be obtained in a non-dusting form by any of the processes known for forming non-dusting powders.

The new anthraquinone dyestuffs, as hereinbefore defined, have good affinity for textile materials comprising artificial fibres, which they dye in level, orange to blue, shades possessing good fastness to washing, to light and to dry heat treatments.

The invention is illustrated but not limited by the following examples in which the parts and percentages are by weight:

Example 1

A solution of 19 parts of 1:4-diamino-2-phenoxyanthraquinone in 180 parts of chlorosulphonic acid is stirred for 18 hours at a temperature of 20° C. The solution is then poured into 800 parts of a mixture of ice and water and the precipitated solid is filtered off and the filter cake washed with water. The filter cake is then added with stirring to a mixture of 200 parts of a 30% aqueous solution of β-chloroethylamine hydrochloride and 600 parts of dimethylformamide to which 30 parts of sodium carbonate have been added. The resulting mixture is stirred for 18 hours at a temperature of 20° C., and then poured into 1,000 parts of water. The precipitated solid is filtered off, washed with water and dried.

The dyestuff so obtained, when dispersed in aqueous medium, dyes polyamide textile materials in reddish-violet shades possessing good fastness to washing.

The dyestuff so obtained consists of the dyestuff of the formula:

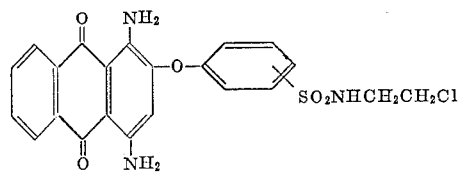

In place of the 19 parts of 1:4-diamino-2-phenoxyanthraquinone used in the above example there are used 21 parts of 5-chloro-1:4-diamino-2-phenoxyanthraquinone or 6-chloro-1:4-diamino-2-phenoxyanthraquinone or 7-chloro-1:4-diamino-2-phenoxyanthraquinone or 8-chloro-1:4-diamino-2-phenoxyanthraquinone whereby similar dyestuffs are obtained.

In place of the 200 parts of a 30% aqueous solution of β-chloroethylamine hydrochloric used in the above example there is used an aqueous solution containing 106 parts of β-bromoethylamine hydrobromide or 67 parts of γ-chloropropylamine hydrochloride or 113 parts of γ-bromopropylamine hydrobromide or 75 parts of γ-chloro-β-hydroxypropylamine hydrochloride or 122 parts of γ-bromo-β-hydroxypropylamine hydrobromide when dyestuffs are obtained which are represented by the formula:

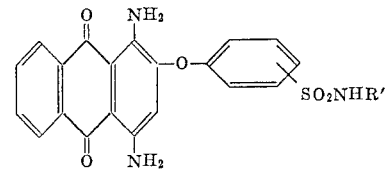

wherein R′ represents a β-bromoethyl, γ-chloropropyl, γ-bromopropyl, γ-chloro-β-hydroxypropyl or γ-bromo-β-hydroxypropyl radical respectively.

Example 2

A solution of 13.2 parts of 1-amino-4-hydroxy-2-phenoxyanthraquinone in 125 parts of chlorosulphonic acid is heated to 75° C. during 30 minutes and then maintained at 75° C. for 10 minutes. The solution is then cooled to 20° C. and poured into 700 parts of a mixture of ice and water. The precipitated solid is then filtered off and washed with water. The solid so obtained is added with stirring to a solution of 28 parts of sodium bicarbonate in 250 parts of water and a solution of 10 parts of β-chloroethylamine hydrochloride and 7.3 parts of sodium bicarbonate in 100 parts of water is then added. The mixture is stirred for 18 hours at a temperature of 20° C., and the precipitated solid is filtered off, washed with water and dried.

The dyestuff so obtained, when dispersed in aqueous medium, dyes polyamide textile materials in red shades possessing good fastness to washing.

The dyestuff so obtained consists of the dyestuff of the formula:

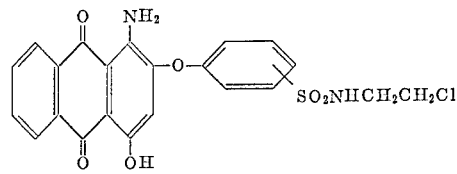

In place of the 10 parts of β-chloroethylamine hydrochloride used in the above example there are used 11.2 parts of γ-chloropropylamine hydrochloride or 14.3 parts of β:γ-dichloropropylamine hydrochloride when similar dyestuffs are obtained.

Example 3

A solution of 10 parts of 1-amino-4-anilino-2-phenoxyanthraquinone in 55 parts of chlorosulphonic acid is stirred for 18 hours at a temperature of 20° C. The solution so obtained is poured into 250 parts of a mixture of ice and water and the precipitated solid is filtered off and washed with water. The solid so obtained is added with stirring to a mixture of 300 parts of a 30% aqueous solution of β-chloroethylamine hydrochloride and 300 parts of acetone to which has been added 15 parts of sodium carbonate, and the mixture is stirred for 18 hours at a temperature of 20° C. 600 parts of water are then added and the precipitated dyestuff is filtered off, washed with water and dried.

The dyestuff so obtained, when dispersed in aqueous medium, dyes polyamide textile materials in reddish-violet shades possessing good fastness to washing.

The dyestuff so obtained consists of the dyestuff of the formula:

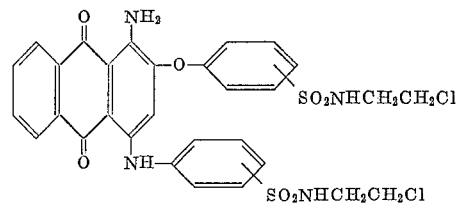

Example 4

A solution of 5 parts of 1:4-diamino-2-phenoxyanthraquinone in 90 parts of chlorosulphonic acid is stirred at a temperature of 20° C. for 18 hours, poured into 400 parts of a mixture of ice and water and the solid which is precipitated is filtered off, washed with water and dried. The solid so obtained is then stirred with a mixture of 100 parts of water and 7 parts of allylamine for 18 hours at a temperature of 20° C. and the precipitated solid is filtered off, washed with water and dried. The dried solid so obtained is stirred in 40 parts of carbon tetrachloride and a solution of 4 parts of bromine in 12 parts of carbon tetrachloride is then added. The mixture is stirred for 18 hours at a temperature of 20° C. and the solid is filtered off and dried. The solid is then added to 100 parts of a 5% aqueous solution of sodium bisulphite, the mixture stirred for 1 hour and the solid filtered off, washed with water and dried.

The dyestuff so obtained, when dispersed in aqueous medium, dyes polyamide textile materials in reddish-violet shades possessing good fastness to washing.

In place of the solution of 4 parts of bromine in 12 parts of carbon tetrachloride there is used a solution of 2 parts of chlorine in 12 parts of carbon tetrachloride when a dyestuff possessing similar properties is obtained.

The dyestuffs so obtained are represented by the formula:

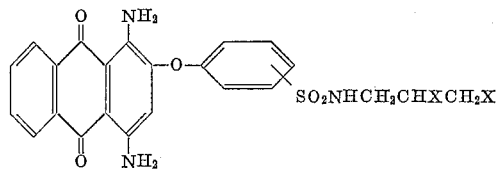

wherein the two X's represent bromide atoms or chlorine atoms respectively.

Example 5

A solution of 5 parts of 1:4-diamino-3-chloro-2-phenoxyanthraquinone in 90 parts of chlorosulphonic acid is stirred for 18 hours at a temperature of 20° C. The solution is then poured into 400 parts of a mixture of ice and water and the solid which is precipitated is filtered off and washed with water. The filter cake so obtained is then added with stirring to a mixture of 85 parts of a 16% aqueous solution of β-chloroethylamine hydrochloride, 90 parts of water and 72 parts of acetone to which has been added 9 parts of sodium carbonate and the resulting mixture is stirred for 18 hours at a temperature of 20° C. The precipitated dyestuff is then filtered off, washed with water and dried.

The dyestuff so obtained, when dispersed in aqueous medium, dyes polyamide textile materials in reddish-violet shades which possess very good fastness to wet treatments.

In place of the 5 parts of 1:4-diamino-3-chloro-2-phenoxyanthraquinone used in the above example there are used 5.6 parts of 1:4-diamino-3-bromo-2-phenoxyanthraquinone when a dyestuff possessing similar properties is obtained.

Example 6

A solution of 5 parts of 1:4-diamino-6-phenoxyanthraquinone in 90 parts of chlorosulphonic acid is stirred for 18 hours at a temperature of 20° C. The solution is then poured into 400 parts of a mixture of ice and water and the solid which is precipitated is filtered off and washed with water. The filter cake so obtained is then added with stirring to a mixture of 85 parts of a 16% aqueous solution of β-chloroethylamine hydrochloride, 90 parts of water and 72 parts of acetone to which has been added 9 parts of sodium carbonate and the resulting mixture is then stirred for 18 hours at a temperature of 20° C. The precipitated dyestuff is then filtered off, washed with water and dried.

The dyestuff so obtained, when dispersed in aqueous medium, dyes polyamide textile materials in violet shades which possess very good fastness to wet treatments.

Example 7

A solution of 5 parts of 1-amino-4-methylamino-8-phenoxyanthraquinone in 90 parts of chlorosulphonic acid is stirred for 18 hours at a temperature of 20° C. The solution is then poured into 400 parts of a mixture of ice and water and the solid which is precipitated is filtered off and washed with water. The filter cake so obtained is then added with stirring to a mixture of 85 parts of a 16% aqueous solution of β-chloroethylamine hydrochloride, 90 parts of water and 72 parts of acetone to which has been added 9 parts of sodium carbonate and the resulting mixture is then stirred for 18 hours at a temperature of 20° C. The precipitated dyestuff is then filtered off, washed with water and dried.

The dyestuff so obtained, when dispersed in aqueous medium, dyes polyamide textile materials in blue shades which possess excellent fastness to wet treatments.

Example 8

5.08 parts of 1-amino-4-anilino-2-phenoxyanthraquinone are treated with chlorosulphonic acid as described in Example 3 above and the resulting sulphonchloride is added to a stirred solution of 8 parts of γ-chloro-β-hydroxypropylamine hydrochloride in 150 parts of water. 160 parts of acetone are then added and the mixture is stirred for 18 hours at a temperature of 20° C. the pH of the mixture being maintained slightly alkaline to litmus by the addition of a 10% aqueous solution of sodium carbonate. The mixture is then added to 500 parts of a 10% aqueous solution of sodium chloride and the dyestuff which is precipitated is separated by decantation, stirred in 100 parts of water, filtered off, washed with a 2% aqueous solution of sodium chloride and dried.

The dyestuff so obtained, when dispersed in aqueous medium, dyes woolen textile materials in bluish-violet shades which possess very good fastness to wet treatments.

Example 9

A solution of 5 parts of 1-amino-4-anilino-2-m-tolylthioanthraquinone in 90 parts of chlorosulphonic acid is stirred for 18 hours at a temperature of 20° C. The solution so obtained is poured into 400 parts of a mixture of ice and water and the precipitated solid is filtered off and washed with water. The solid so obtained is added with stirring to a mixture of 35 parts of a 16% aqueous solution of β-chloroethylamine hydrochloride, 150 parts of water and 150 parts of acetone to which has been added 10 parts of sodium carbonate. The resulting mixture is stirred for 18 hours at a temperature of 20° C. and is then poured into 1,000 parts of water containing 100 parts of sodium chloride. The dyestuff which is precipitated is then filtered off, washed with a 5% aqueous solution of sodium chloride and dried.

The dyestuff so obtained, when dispersed in aqueous medium, dyes polyamide textile materials in blue shades which possess excellent fastness to wet treatments.

Example 10

In place of the 19 parts of 1:4-diamino-2-phenoxyanthraquinone used in Example 1 there are used 24 parts of 1-amino-4-anilino-7-phenylthioanthraquinone when a dyestuff is obtained which dyes polyamide textile materials in reddish-blue shades possessing good fastness to washing.

Example 11

In place of the 10 parts of 1-amino-4-anilino-2-phenoxyanthraquinone used in Example 3 there are used 10 parts of 1:4-di(amino)-2:5-di(phenoxy)anthraquinone whereby a dyestuff is obtained which dyes polyamide textile materials in reddish-violet shades possessing good fastness to washing.

Example 12

In place of the 19 parts of 1:4-diamino-2-phenoxyanthraquinone used in Example 1 there are used 19 parts of 1:4-diamino-5-phenoxyanthraquinone or 18 parts of 1-amino-4-cyclohexylamino-2-phenoxyanthraquinone when dyestuffs are obtained which dye polyamide textile materials in reddish-violet to violet shades possessing good fastness to wet treatments.

Example 13

In place of the 5 parts of 1-amino-4-methylamino-8-phenoxyanthraquinone used in Example 7 there are used 5 parts of 1-amino-4-isopropylamino-8-phenoxyanthraquinone or 5 parts of 1:4-di(methylamino)-8-phenoxyanthraquinone when dyestuffs possessing similar properties are obtained.

Example 14

In place of the 5.08 parts of 1-amino-4-anilino-2-phenoxyanthraquinone used in Example 8 there are used 4.5 parts of 1-amino-2-(4'-methylphenoxy)-4-(4''-methylanilino)-anthraquinone when a dyestuff is obtained which dyes polyamide textile materials in violet shades possessing very good fastness to wet treatments.

Example 15

In place of the 5.08 parts of 1-amino-4-anilino-2-phenoxyanthraquinone used in Example 8 there are used 4.8 parts of 1-amino-4-anilino-7-phenylthioanthraquinone when a dyestuff is obtained which dyes polyamide textile materials in reddish-blue shades possessing very good fastness to wet treatments.

The dyestuff so obtained is the dyestuff of the formula:

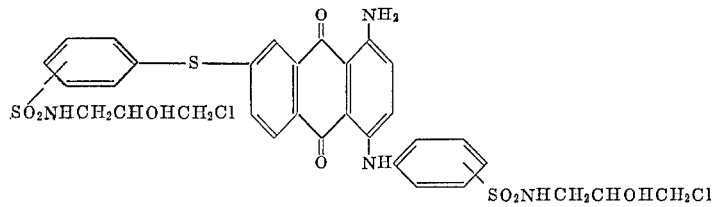

This application is a continuation-in-part application of our application Serial No. 8,536 which was filed on February 15, 1960, and which is now abandoned.

What we claim is:

Water-insoluble anthraquinone dyestuffs of the formula:

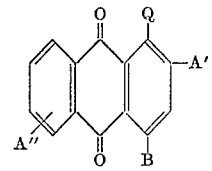

wherein Q represents a member selected from the group consisting of amino, lower alkylamino and cyclohexylamino; one of A' and A'' represents a group of the formula: —X—Y—SO$_2$NH—R and the other of A' and A'' represents a member selected from the group consisting of hydrogen and a group of the formula:

$$-X-Y-SO_2NH-R$$

B represents a member selected from the group consisting of hydroxy, amino, lower alkylamino, cyclohexylamino and a —NH—Y—SO$_2$NH—R group; X represents a member selected from the group consisting of —O— and —S—; Y represents a member selected from the group consisting of phenylene and tolylene, R represents a member selected from the group consisting of β-chloroethyl, β-bromoethyl, γ-chloropropyl, γ-bromopropyl, γ-chloro-β-hydroxypropyl, γ-bromo-β-hydroxypropyl, β:γ-dichloropropyl and β:γ-dibromopropyl, and the anthraquinone nucleus can carry additional substituents selected from the group consisting of chlorine and bromine.

References Cited in the file of this patent

UNITED STATES PATENTS 2,784,204     Heyna et al. _____ Mar. 5, 1957

FOREIGN PATENTS 847,142     Great Britain _____ Sept. 7, 1960

OTHER REFERENCES

Wegmann: "Textil-Praxis" (1958), pp. 1056–1061.